United States Patent [19]

Chang et al.

[11] Patent Number: 4,977,519

[45] Date of Patent: Dec. 11, 1990

[54] LASER PRINTER CONTROLLER FLEXIBLE FRAME BUFFER ARCHITECTURE WHICH ALLOWS SOFTWARE TO CHANGE X AND Y DIMENSIONS OF THE BUFFER

[75] Inventors: Hershow Chang, Los Altos; Seong Kim, Saratoga; Tetsuro Motoyama, San Jose, all of Calif.

[73] Assignees: Ricoh Company, Ltd.; Ricoh Corporation, both of San Jose, Calif.

[21] Appl. No.: 379,018

[22] Filed: Jul. 12, 1989

[51] Int. Cl.[5] .............................................. G06F 9/00
[52] U.S. Cl. .................................. 364/519; 364/239; 364/200
[58] Field of Search ............... 364/518, 519, 520, 239; 346/154; 358/296

[56] References Cited

U.S. PATENT DOCUMENTS 4,467,448  8/1984  Regehr et al. ...................... 364/900

*Primary Examiner*—Arthur G. Evans
*Attorney, Agent, or Firm*—Flehr, Hohbach, Test, Albritton & Herbert

[57] ABSTRACT

The present invention relates to a frame buffer used by a laser printer controller to send video signals to a laser printer engine. The frame buffer allows software to have sufficient control over the dimension of the buffer and to have sufficient time to process data by allowing software to change X and Y dimensions of the buffer.

8 Claims, 8 Drawing Sheets

FIG.—1

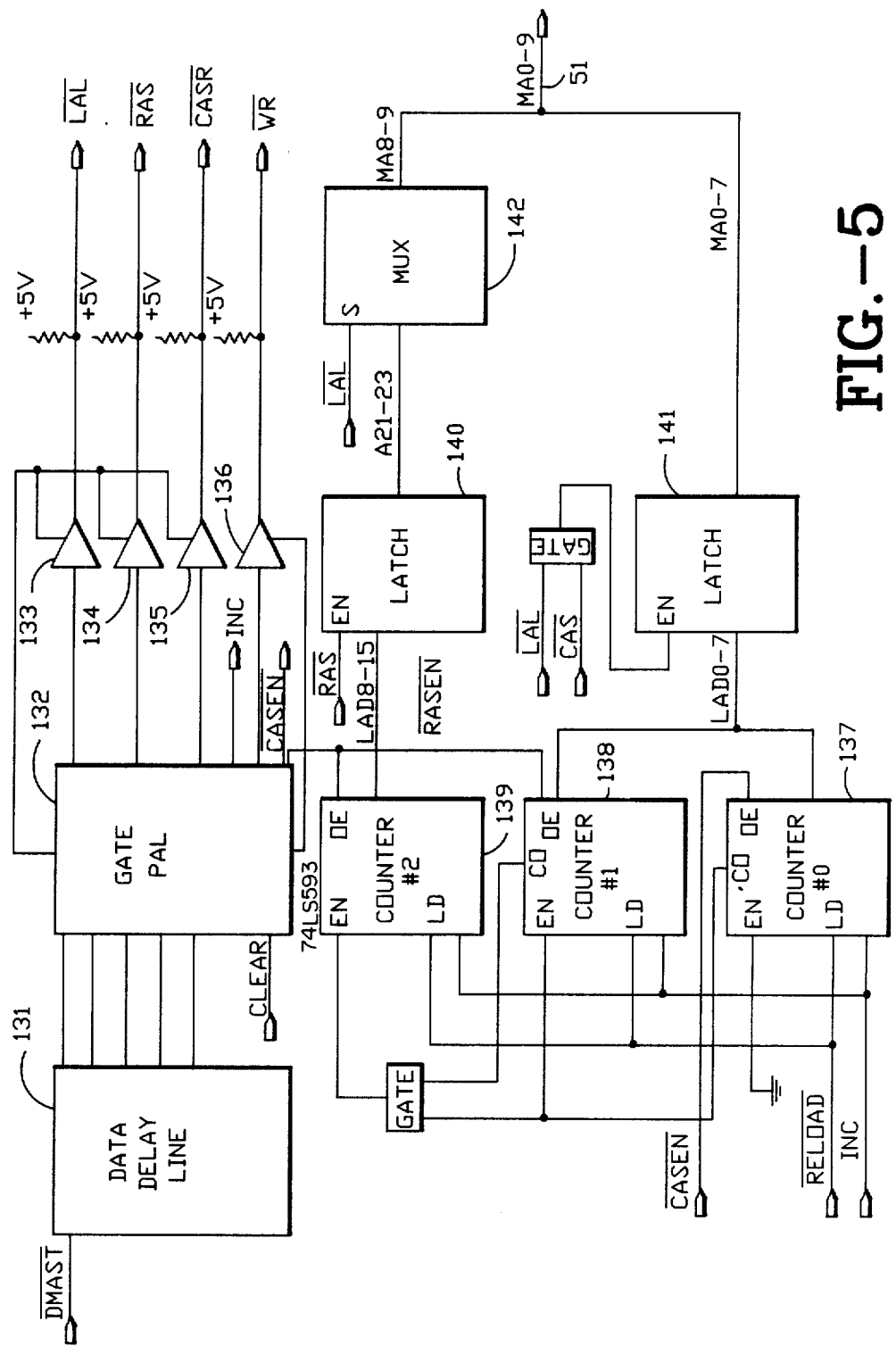
FIG.—5

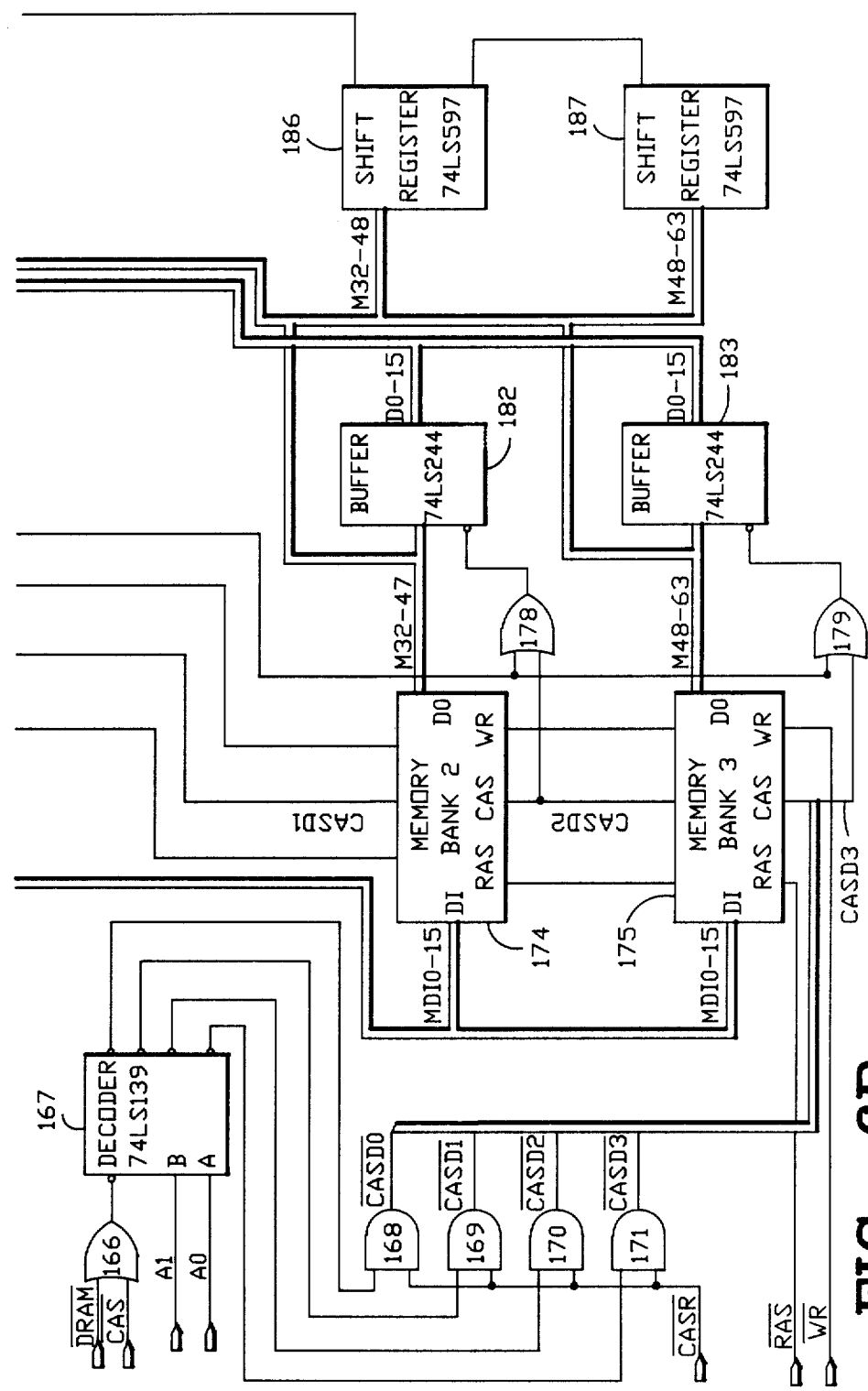
FIG.—6B

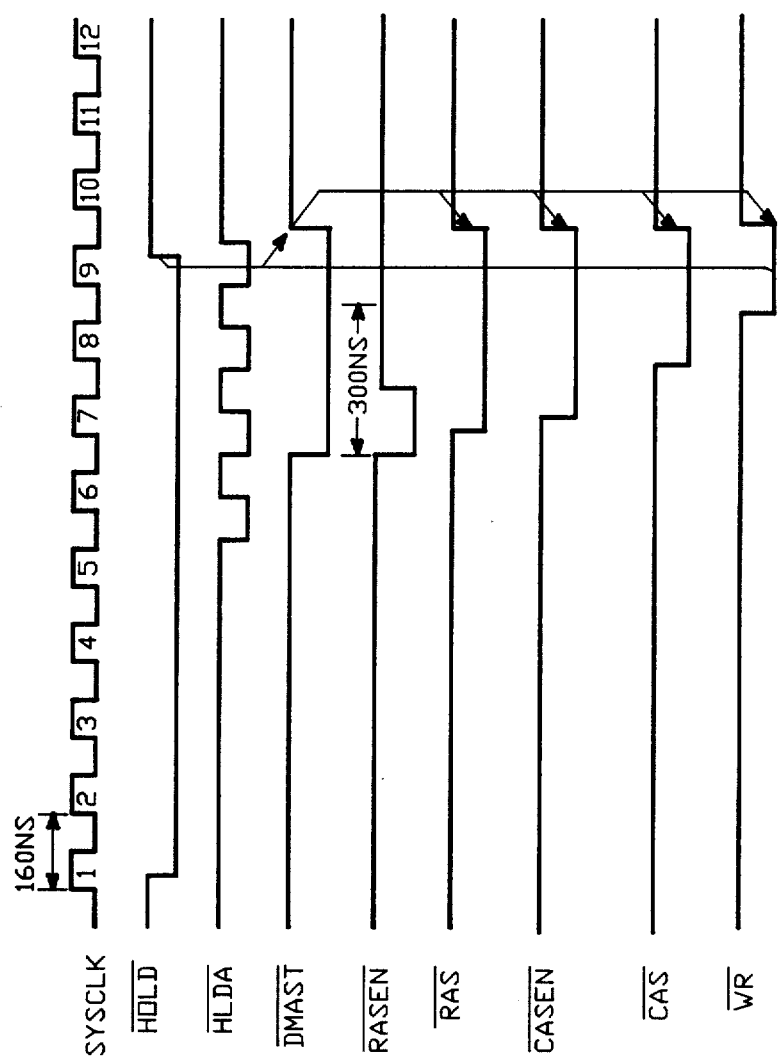
FIG.—7

LASER PRINTER CONTROLLER FLEXIBLE FRAME BUFFER ARCHITECTURE WHICH ALLOWS SOFTWARE TO CHANGE X AND Y DIMENSIONS OF THE BUFFER

BACKGROUND OF THE INVENTION

The present invention is intended to be utilized with a printer controller for a laser printer engine which has, for example, 400 Dots Per Inch (DPI) with 20 pages per minute (ppm) speed. Because such an engine has higher speed and higher resolution, the printer controller requirements are more severe than 300 DPI and 8 ppm engines.

One of the key components to achieve higher speed and higher resolution is the control of a frame buffer used to buffer raster image information to be sent to the printer engine through a video interface.

In order to print through a laser printer, each pixel (picture element) must be defined as either black or white. A pixel is processed by the CPU (Central Processing Unit) of a controller and sent to the laser printer engine through video interface line(s). One major problem in this process of defining pixels of a page and sending the information to the printer engine is that the CPU is much slower in the processing time required to define the pixels than the printer engine needing them. One solution of this asynchronous process is to use a frame buffer for the synchronization.

There are two approaches in the prior art to construct a frame buffer. One approach is to create an entire page pixel definition by using a full bit map.

For example, if the printer engine is 300 DPI and handles only a letter size document, the buffer requires $2550 \times 3300$ pixels. The first number denotes the X dimension of the scanning (the number of pixels per scan line) and the second number denotes the number of scan lines (the Y dimension).

The other prior art approach is to receive an entire page description from a host computer and to create a display list. Under this approach, the frame buffer can be smaller than the full bit map depending upon the speed of creating the raster data from the display list. The frame buffer, which is smaller than full page bit map, is referred to as a band buffer.

The prior art approaches of constructing a frame buffer is to either fix the X and Y dimensions or fix the X dimension allowing the extension of the Y dimension. The problem with these prior approaches is that both result in waste of buffer space when paper sizes change. For example, some printer engines allow users to change paper trays. Therefore, in order to accommodate the largest paper input, the X dimension of the buffer must have 4400 pixels. However, when a letter size tray is used with 8½ edge to the X dimension, the requirement of X dimension is only 3400 pixels, wasting 1000 pixels (124 bytes).

SUMMARY AND OBJECTS OF THE INVENTION

It is an objective of the present invention to provide an improved laser printer control system.

According to one aspect of the present invention, the improved system provides a variable and software programmable X-Y dimension of the frame buffer. The control software, after recognizing the size of the particular paper tray to be utilized with the printer engine, can set X-Y dimensions of the frame buffer. In addition, the same hardware and buffering scheme can be employed for band buffer and full bit map application.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

FIG. 5 depicts a DMA timing and address generator circuit diagram which forms a portion of FIG. 4.

FIGS. 6A and 6B depict a frame buffer and surrounding circuit diagram which forms a portion of FIG. 4.

FIG. 7 depicts a DMA timing diagram.

DETAILED DESCRIPTION OF THE DRAWINGS

Reference will now be made in detail to the preferred embodiment of the invention, an example of which is illustrated in the accompanying drawings. While the invention will be described in conujunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
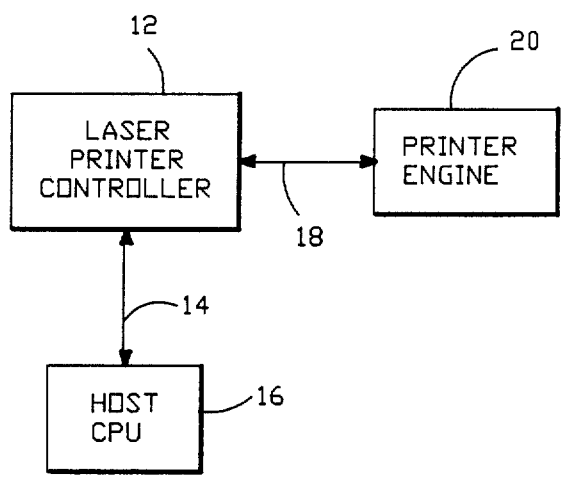
FIG. 1 depicts a block diagram of a control system for controlling a laser printer.

Referring now to FIG. 1, a block diagram of a control system 10 controlling a laser printer is depicted. In FIG. 1, a laser printer controller 12 is connected to a host CPU 16 via communication bus 14. Laser printer controller 12 is also connected to a laser printer engine 20 via a common communication bus 18.

The printer engine 20 could be any suitable type printer engine. In a preferred embodiment, printer engine 20 is one manufactured by Ricoh Corporation and Ricoh Company, Ltd., known as Imagio, which has 400 dots per inch (DPI) with 20 pages per minute (PPM) speed. Other types of printer engines, however, could be utilized with a laser printer controller according to the present invention.

Figure 2:
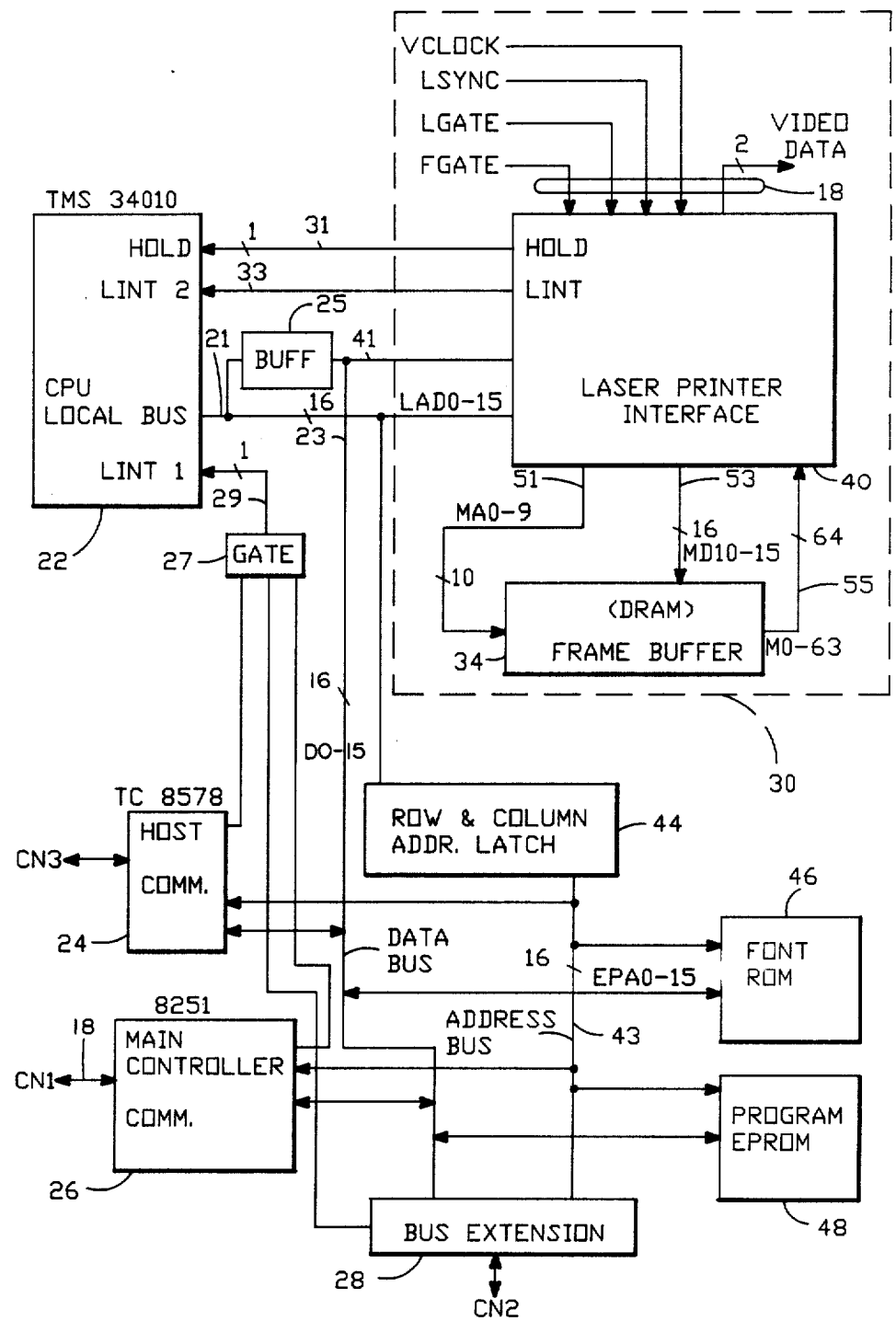
FIG. 2 depicts a block diagram of a laser printer controller system.

FIG. 2 shows an implementation of the laser printer controller according to the present invention. In FIG. 2, the laser printer controller 10 includes a CPU 22 (typically a TMS/34010 manufactured by Texas Instruments) for controlling the operation of the frame buffer.

The laser printer controller 10 of FIG. 12 also includes a host communication bus connection 24 to host CPU 16 of FIG. 1. Controller 10 includes a main controller communication bus connection 26 to the printer engine 20 of FIG. 1. Controller 10 includes a laser printer interface connection bus 18 to provide video data to printer engine 20 of FIG. 1. The laser printer interface bus 18 also includes the VCLOCK, LSYNC, LGATE and FGATE timing signals from printer engine 20 of FIG. 1.

The laser printer interface 18 of FIG. 2 is connected to the frame buffer 34 via bus 51 (MA0-9), bus 54 (MDI0-15), and bus 55 (M0-63).

The system 10 of FIG. 2 further includes a FONT ROM 46 and PROGRAM EPROM 48 and a bus extension circuit 28 to provide for future expansions such as additional memory and the like.

The system 10 of FIG. 2 also includes various data and address buses, such as data bus 23 (D0-15), address bus 43 (EPA0-15), and the like. Such buses are well known and need not be described in any great detail. The aspects of the present invention are shown in the dotted area defined by numeral 30. These aspects will now be described in conjunction with FIGS. 3–8.

Figure 3:
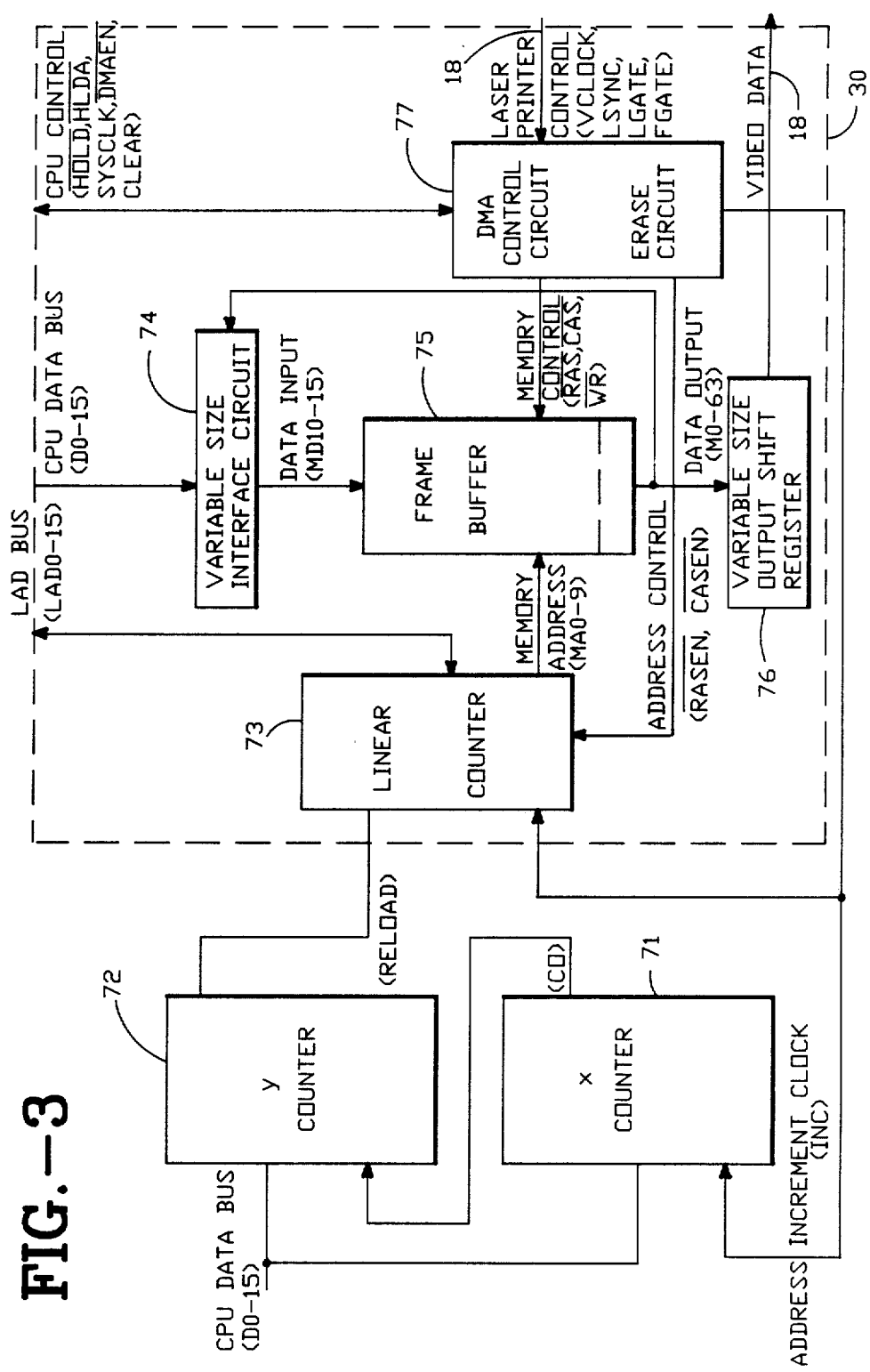
FIG. 3 depicts a variable frame buffer block diagram which forms a portion of FIG. 2.

FIG. 3 is the expansion of the defined area 30 in FIG. 2. The X counter 71 holds the number of dots per scan line.

The Y counter 72 holds the number of scan lines. Both counters 71, 72 are 16-bit software programmable up counters. When the X counter 71 value reaches to the value set by the software, a one-shot pulse (CO) is sent to Y counter 72, incrementing its value. When the Y counter 72 value reaches to the value set by the software, the one-shot pulse is sent to linear counter 73, reloading the original starting address.

Those counters 71, 72, 73 are implemented by using Intel 82C54. An example of software flow chart to program counters 71, 72, 73 is listed in FIG. 8.

Linear counter 73 translates X and Y counters 71, 72 to the linear counter of the frame buffer address during DMA operation. Linear counter 73 is described as Latch and Mux 129 and DMA Address Linear Counter 130 in FIG. 4.

In FIG. 3, the variable size interface circuit 74 interfaces wider frame buffer data width (in one implementation 64 bits) to 16 bits CPU data bus, which is described as buffer 122, gate 123 and CAS generator 145 in FIG. 3. The DMA control circuit 77 transfers the wider data (64 bits) to the variable shift register 76, where the shift register 76 serially shifts the data out to the laser printer engine 20 via bus 18. DMA circuit 77 is described as 121, Dot Counter 121, latches 125-127 and dynamic random access memory timing generator 128 in FIG. 4. Register 76 is described as shift register with input latch 124 in FIG. 4.

Figure 4:
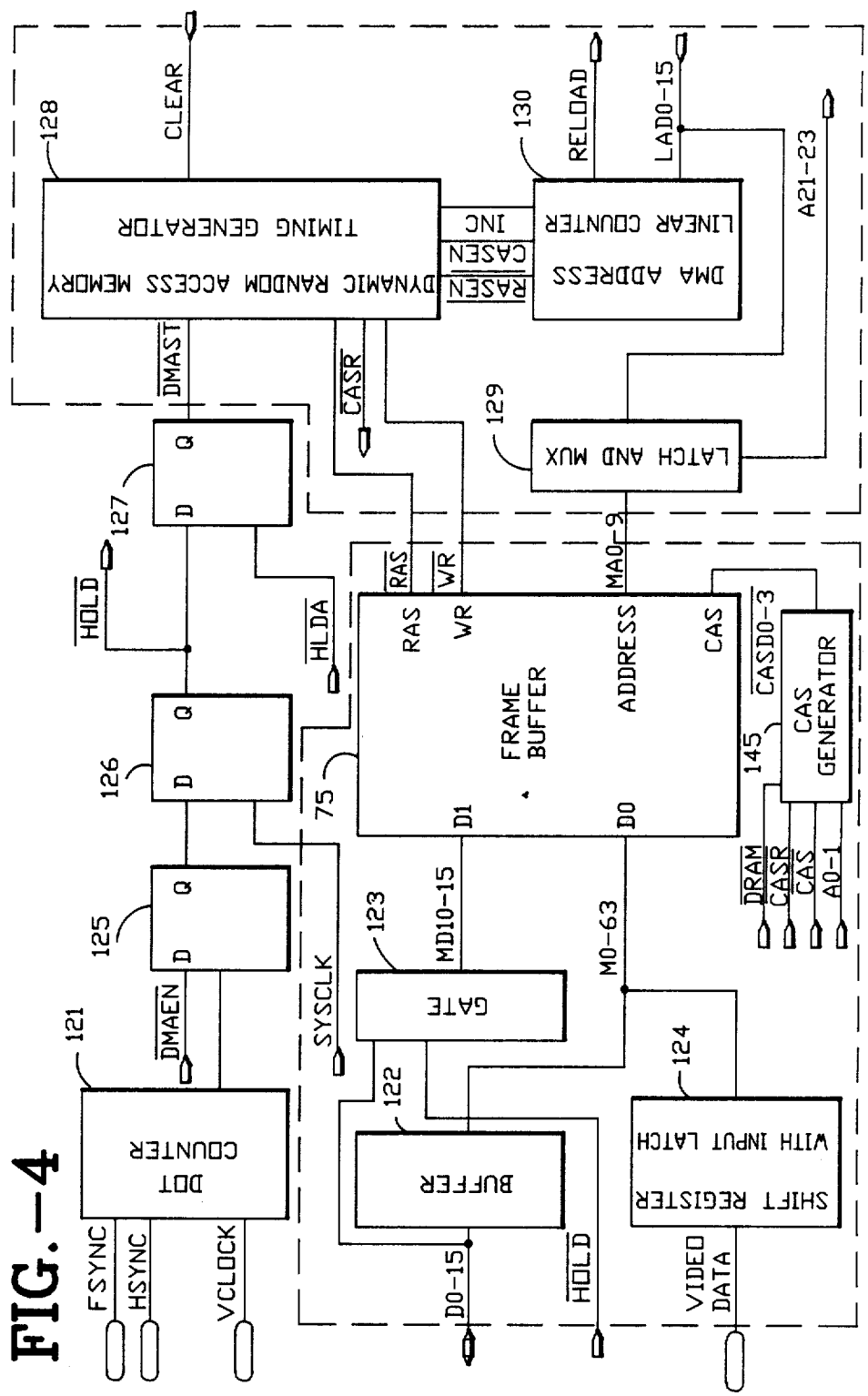
FIG. 4 depicts a DMA (Direct Memory Access) control block diagram which forms a portion of FIG. 3.

FIG. 4 shows the DMA controller block of FIG. 3. The dot counter 121 controlled by the Laser Printer Video signals generates DMA request whenever shift register 124 shifts out all data. The variable size interface circuit 74 in FIG. 3 consists of two parts. One is 64 bit buffer 122 which provides the interface for the CPU data bus of 16 bits to a wider frame buffer memory of 64 bits. The other part is the gate 123, which sets all 64 bits to zero input when the DMA cycle starts.

When the memory clear is enabled, the lowering of the WR-signal causes all the 64 bits input data to be zero. Therefore, the memory location is cleared during the same DMA cycle. This memory clearing function can be disabled so that the WR- signal stays in the high level during the DMA cycle and the memory data will not be changed.

Figure 6A:
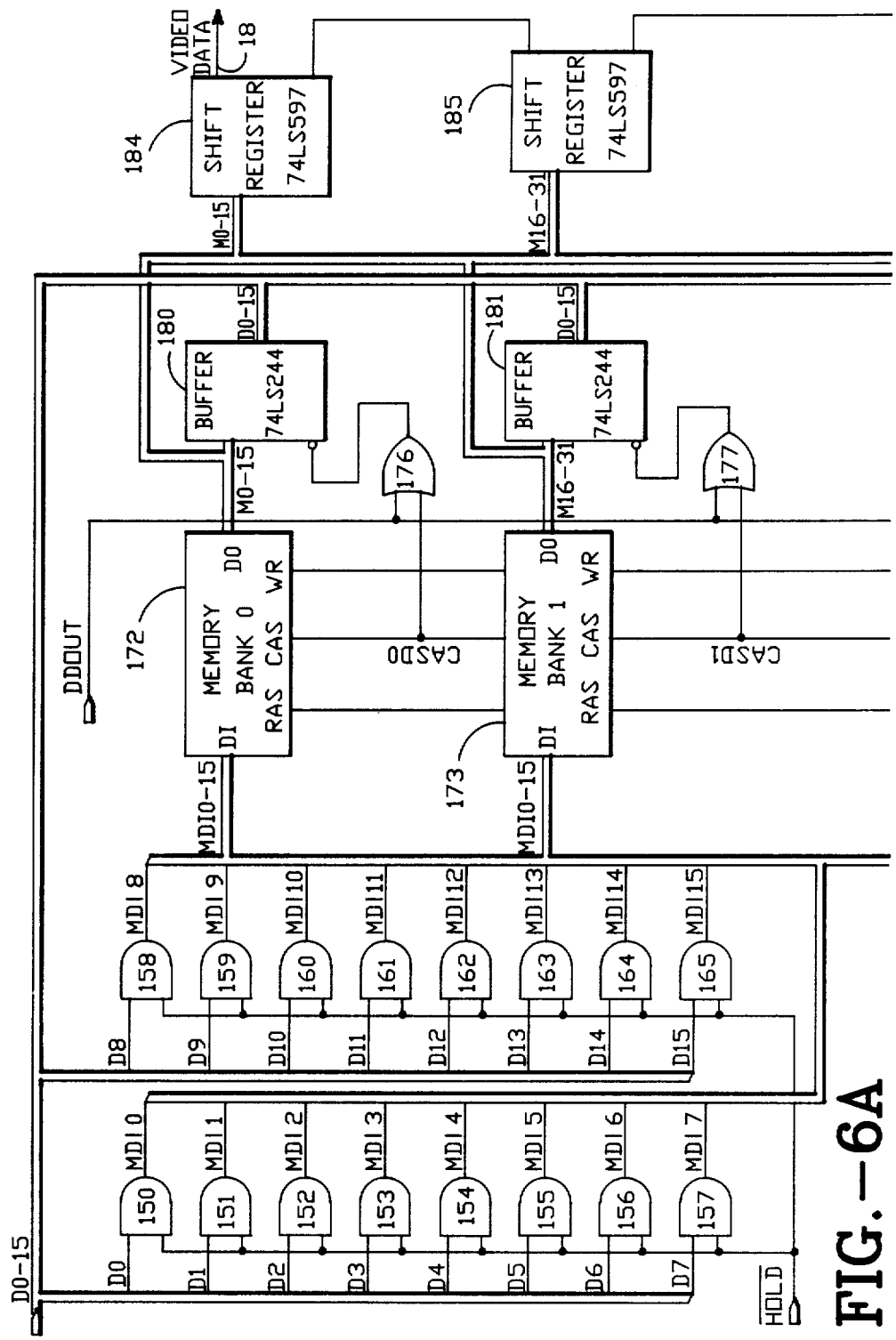

The CAS generator 145 of FIG. 4 generates four CASD0-3 signals which control four memory banks (as seen in FIG. 6) of 16 bits width. When the CPU reads or writes the frame buffer, only one CASD signal is selected, so that only 16 out of 64 bit bus are used. At the DMA cycle, all four CASD cycles are functional, resulting in an effective M0-63 bus. A more detailed mechanism is shown in FIG. 6.

In FIG. 4, Flip/Flops 125, 126 and 127 form a DMA synchronization circuit. They generate the DMAST- signal. The signal goes into the Dynamic Random Access Memory Timing Generator 128 to produce the RAS-, CASR- and WR-signals to control Dynamic RAM, and the RASEN-, CASEN- and INC signals to control DMA address counter 130. The DMA address linear counter 130 counts up by the INC signal and reloads by the RELOAD signal which comes from Y counter 72 in FIG. 3. The DMA address linear counter 130 provides the DRAM address during the DMA cycles. Timing generator 128 is described as data delay line 131, gate PAL 132, and buffers 133-136 in FIG. 5. Latch and mux 129 is described as Latch 140, Latch 141, and Mux 142 in FIG. 5. DMA address linear counter 130 is described as Counter 137, Counter 138 and Counter 139 in FIG. 5.

In FIG. 5, DMA Timing and Address Generator Circuit 128 is the expansion of DMA timing generator 128, Latch and Mux 129, and DMA address linear cuonter 130 of FIG. 4. The DMAST- signal goes into the data delay line 131 and gets a different timing interval. It then goes through a gating Program Array Logic (PAL) 132 to generate the necessary timing and control for the DMA control. The PAL 132 generates the RAS-, CASR-, WR- and LAL- signals which go through tri-state buffers 133-136 and provide the DRAM control signals during DMA.

The counters #0 through #2 (137, 138, 139) are three ripple counters. They count up with INC signal which comes from PAL 132. The counters 137, 138, 139 reload the programmed start values when Y counter 72 reaches to its maximum value. The counters 138, 139 contain higher memory address which comes out during RAS time. The counter 138 address goes through latch 141 to provide DRAM row address MA0-7 at RAS time. The counter 139 address is stored in latch 140. The latched address provides two DMA address bits (MA8-9) at both RAS can CAS time through Mux 142. The counter 137 is a low address counter. It provides the 8 bits DMA memory address at CAS time.

Gate 123 of FIG. 4 consists of 16 AND GATES 150-165. At normal CPU cycle, the HOLD- signal stays high. The CPU data (D0-15) passing through these gates become input data MDI0-15 to the frame buffer with the same logical state. At the DMA cycle, the HOLD- signal becomes low, which forces all MDI0-15 data to low level. When the clear memory function is enabled, the write operation follows the read operation. All the 64 bits input to the frame buffer of four memory banks 172-175 will be cleared through 16 bits of MDI0-15 input.

The frame buffer 75 of FIG. 3 is made up of four memory banks 172-175, as shown in FIG. 6. Input of each bank has 16 bits data path (MDI0-15) which is the same width as the CPU data bus (D0-15). The number of banks can be varied from 1, 2, 4, 8, and so on, to match the speed of laser printer engine 20.

Four banks were selected for one preferred implementation, resulting in 64-bit output data path (M0-63). Each memory bank 172-175 of FIG. 6 has the same RAS-, WR- signal lines and 16-bit input data lines of MDI0-15, but has different output data lines (16 of M0-63) and CAS signal line (one of CASD0-3). The timing of the DMA operation is shown in FIG. 7.

Since the CAS signal is an important signal for read or write operation of memory bank, the CAS signal can be controlled in order to control the variable frame buffer operation.

The CAS generator 145 of FIG. 4 consists of an OR GATE 166, a decoder 167 and four AND GATEs 168-171, as shown in FIG. 6. Signal DRAM- comes from CPU address decoder 167. CAS-, A0 and A1 are from CPU. These signals go into the CAS generator 145. Gate 166 and decoder 167 select one out of four CASD0-3 signals at the normal CPU operation cycle. When the DMA operation CASR- signal from timing generator 128 of FIG. 4 goes active (low), all four CASD0-3 become active at the same time, allowing operation on all the four memory banks 172-175 at the same time.

The buffer 122 of FIG. 4 consists of four OR GATEs 176-179 and buffers 180-183, which selects one set of the memory bank output data (M0-63) to the CPU data bus (D0-15) at the normal CPU operation cycle. During DMA cycle, the DDOUT signal which comes from CPU stays high and all of the buffers 180-183 are in the tri-state stage blocking the data to CPU bus.

The shift register with input latch 124 of FIG. 4 consists of four blocks of shift registers 184-187, as also seen in FIG. 6. Those shift registers 184-187 latch 64 bits memory bank data (M0-63) during the DMA cycle and serially shift out to the laser printer 20.

FIG. 7 shows the design timing chart for the DMA circuit, including the SYSCLK, HOLD-, HLDA-, DMAST-, RASEN-, RAS-, CASEN-, CAS-, and WR- timing signals.

Figure 8:
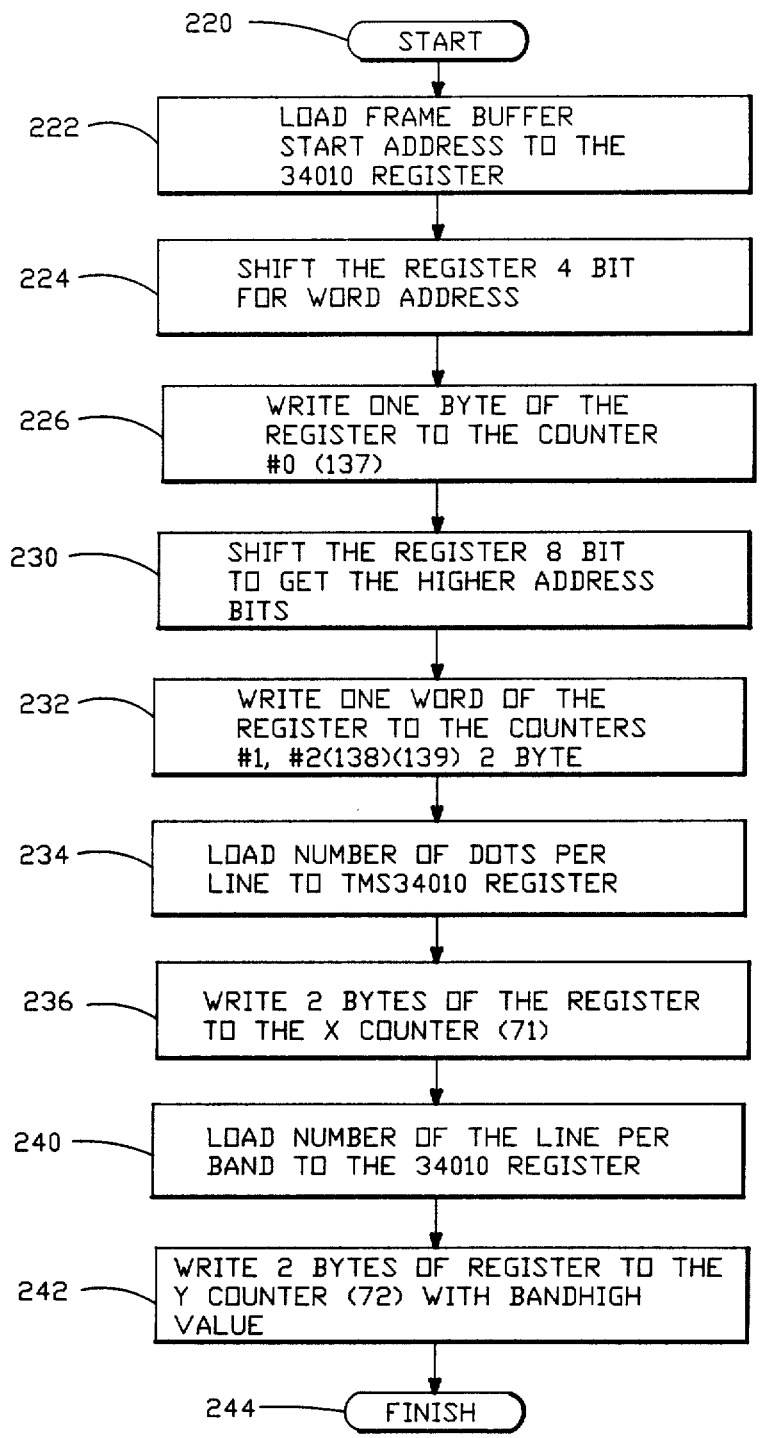
FIG. 8 depicts a software flow chart for initialization of the X, Y and linear counters which form a portion of FIG. 3.

FIG. 8 shows the software flow chart example to set the starting address, X counter and Y counter. Referring now to FIG. 8, a software flow chart for initialization of the X, Y and linear counters 72, 71 and 73 of FIG. 3 is shown. In FIG. 8, after start step 220, the flow chart starts with step 222 of loading the frame buffer start address to the register of CPU 22 of FIG. 2.

The next step 224 is to shift the register four bits for word address.

The next step 226 writes one byte of the register to the counter 137 of FIG. 5.

At step 230, the flow chart of FIG. 8 shifts the register 8 bits to get the higher address bits.

The next step 232 writes one word of the register to counters 138, 139 of FIG. 5.

The next step 234 in FIG. 8 loads the number of dots per line to the register of CPU 22 of FIG. 2.

The next step 236 in FIG. 8 writes two bytes of the register to the X counter 71 of FIG. 3.

The next step 240 loads the number of line per band to the register of CPU 22 of FIG. 2.

The next step 242 of FIG. 8 writes two bytes of the register to the Y counter 72 of FIG. 3 with a bandhigh value.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and its various embodiments and with various modifications as are suited to the particular use contemplated. It is intended that the scope of the invention be defined only by the claims appended hereto.

What is claimed is:

1. A laser printer controller system comprising
   a laser printer for printing data on various size documents wherein said documents include first documents having a first size, and second documents having a second, different size,
   a controller for controlling said printer, said controller including
   a linearly variable frame buffer for receiving input digital data representative of a first number of scan lines and a second number representative of the number of pixels (dots) per scan line, and
   control means for linearly changing said first or second number, depending upon the size of the first or second documents to be printed by said printer.

2. A system as in claim 1 including a first counter means for storing control information corresponding to said first number and a second counter means for storing control information corresponding to said second number.

3. A system as in claim 2 wherein first and second counter means are software programmable counters.

4. A system as in claim 3 including linear counter means responsive to said first and second counter means for linearly varying the size of said frame buffer.

5. In a laser printer controller system including a laser printer for printing information on various size documents wherein said documents include first documents having a first size and second documents having a second, different size, a controller comprising
   means for controlling said printer,
   a linearly variable frame buffer for receiving input digital data representative of a first number of scan lines and a second number representative of the number of pixels (dots) per scan line, and
   means for linearly changing said first or second number, depending upon the size of the first or second documents to be printed by said printer.

6. A system as in claim 4 including DMA memory means and DMA control means for reading data from said memory means to said laser printer.

7. A raster output controller system comprising
   a raster output device for printing data on various size documents wherein said documents include first documents having a first size and second documents having a second, different size,
   a controller for controlling said output device, said controller including
   a linearly variable frame buffer for receiving input digital data representative of a first number of scan lines and a second number representative of the number of pixels (dots) per scan line, and
   control means for linearly changing said first or second number, depending upon the size of the first or second documents to be printed by said output device.

8. In a raster output controller system including a raster output device for printing characters, graphics or images on various size documents wherein said documents include first documents having a first size and second documents having a second, different size, a controller comprising
  means for controlling said raster output device,
  a linearly variable frame buffer for receiving input digital data representative of a first number of scan lines and a second number representative of the number of pixels (dots) per scan line, and
  means for linearly changing said first or second number, depending upon the size of the first or second documents to be printed by said output device.

* * * * *

UNITED STATES PATENT AND TRADEMARK OFFICE
CERTIFICATE OF CORRECTION

PATENT NO. : 4,977,519

DATED : December 11, 1990

INVENTOR(S) : Hershow Chang, Seong Kim, Tetsuro Motoyama

It is certified that error appears in the above-identified patent and that said Letters Patent is hereby corrected as shown below:

ON TITLE PAGE: , under "Assignees", after "Ltd." insert --of Tokyo, Japan--;

after "Corporation" delete "both".

In the Drawings:

Sheet 2, Figure 2, replace "DO-15" with --D0-15-- and replace "MD10-15" with --MDIO-15--.

Sheet 3, Figure 3, replace "MD10-15" with --MDIO-15--.

Sheet 4, Figure 4, replace "MD10-15" with --MDIO-15-- and replace "D1" with --DI--.

Sheet 7, Figure 6B, replace "M32-48" with --M32-47--.

UNITED STATES PATENT AND TRADEMARK OFFICE
CERTIFICATE OF CORRECTION

PATENT NO. : 4,977,519

DATED : December 11, 1990

INVENTOR(S) : Hershow Chang, Seong Kim Tetsuro Motoyama

It is certified that error appears in the above-identified patent and that said Letters Patent is hereby corrected as shown below:

Column 1, line 57,   replace "124" with --125--.

Column 2, line 42,   replace "conujunction" with --conjunction--.
          line 50,   after "system" delete "10".
          line 66,   delete "10".

Column 3, line 1,    replace "FIG. 12" with --FIG. 2--.

Column 3, lines 1, 3, 5, 14 and 18,  replace "10" with --12--.

Column 4, line 32,   replace "cuonter" with --counter--.

Signed and Sealed this

Second Day of June, 1992

*Attest:*

DOUGLAS B. COMER

*Attesting Officer*      *Acting Commissioner of Patents and Trademarks*